Figure 1:
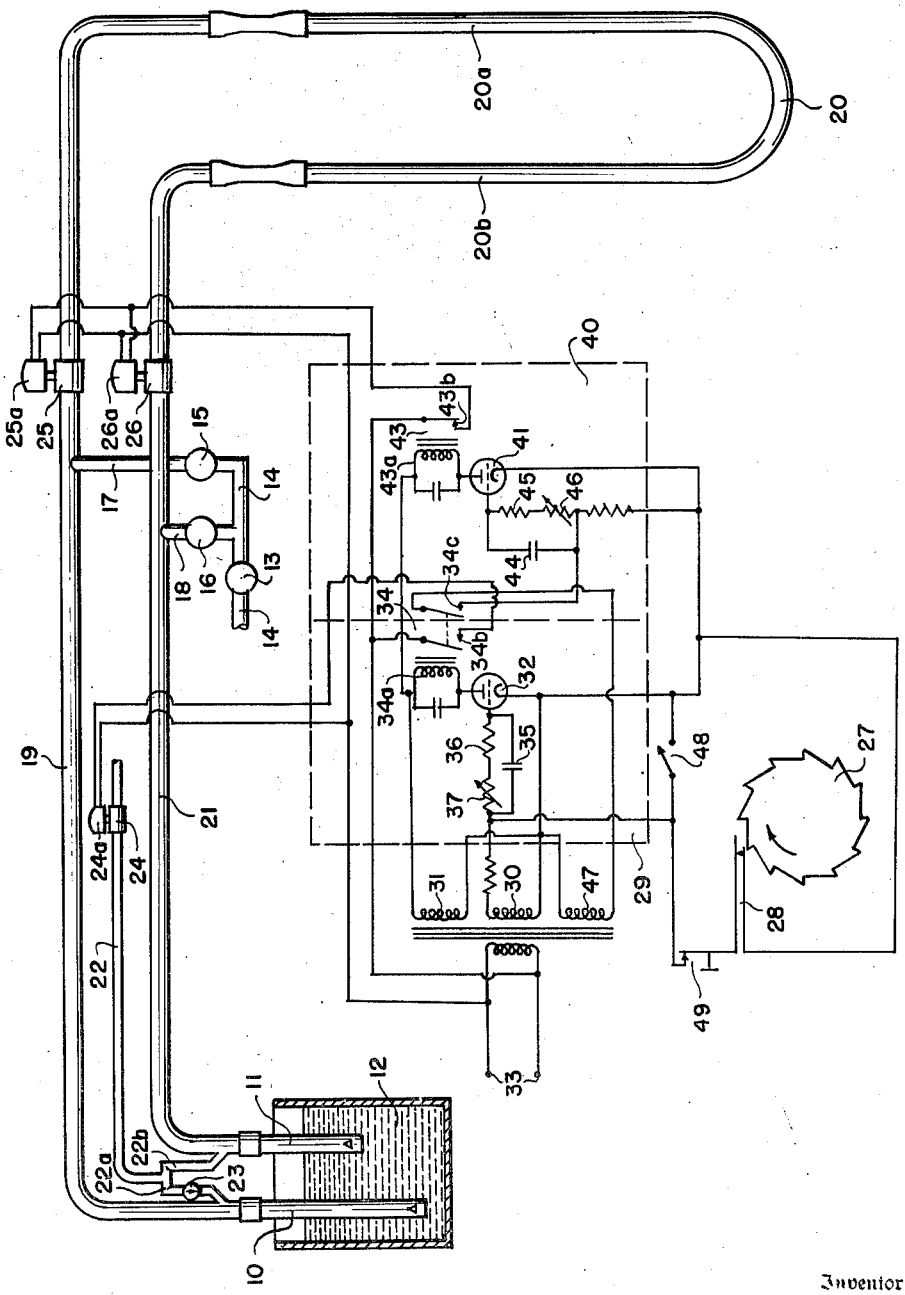

INVENTOR:
CARLTON M. MARQUARDT,
BY
ATTORNEYS.

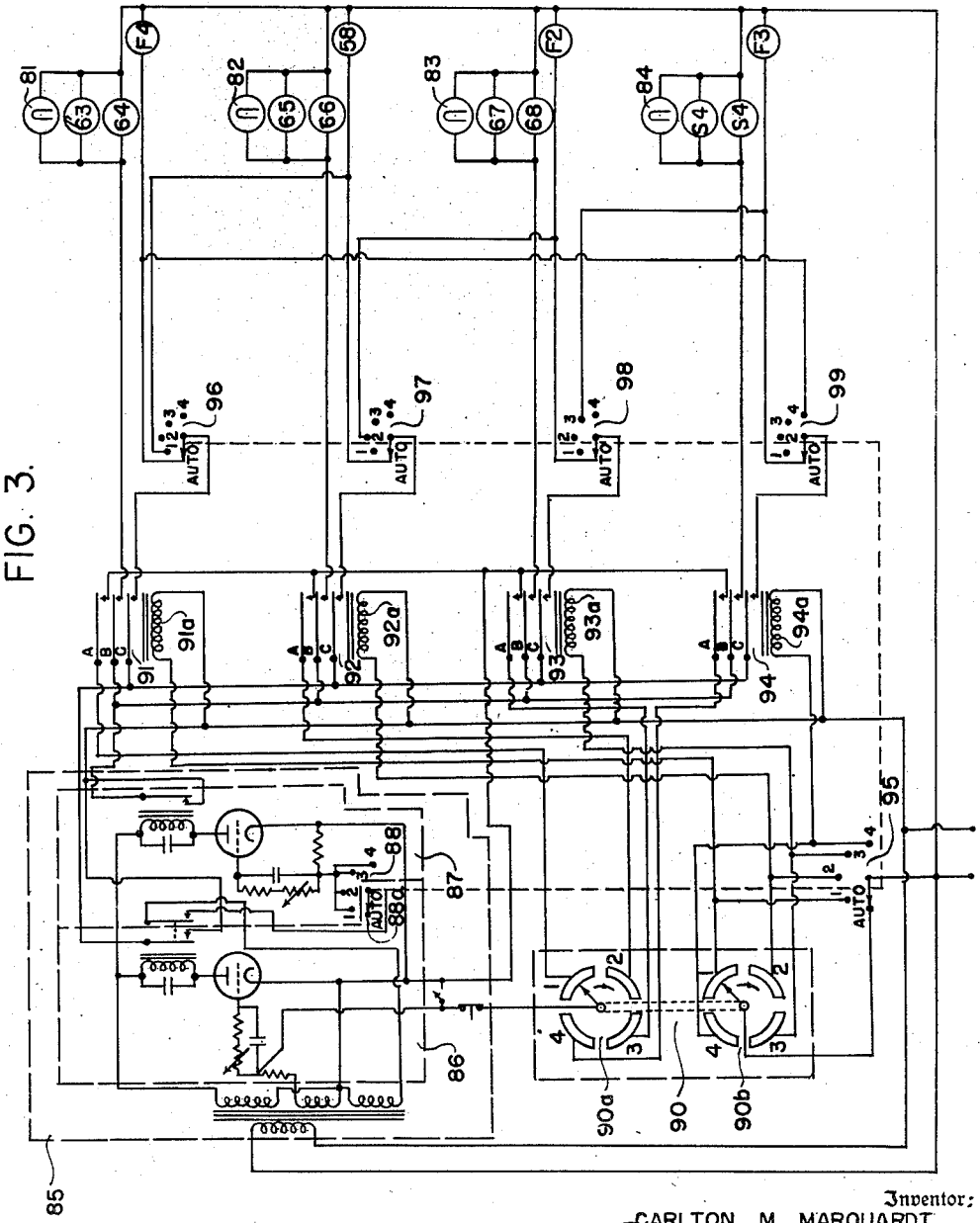

Patented July 29, 1952

2,604,778

UNITED STATES PATENT OFFICE 2,604,778

FLUSH SYSTEM FOR SPECIFIC GRAVITY MEASURING DEVICES EQUIPPED WITH BUBBLE TUBES

Carlton M. Marquardt, Salt Lake City, Utah, assignor to Combined Metals Reduction Company, Salt Lake City, Utah, a corporation of Utah Application August 27, 1948, Serial No. 46,446

17 Claims. (Cl. 73—32)

This invention relates to specific gravity measurement devices of the type equipped with bubble tubes which produce differential pressures operative upon a pressure gauge to produce a reading indicative of the specific gravity of a liquid or semi-liquid. It is particularly concerned with a flush system for maintaining the bubble tubes free from sediment and accumulations of scum.

It is common practice in many industries requiring measurements of the specific gravity of liquids or semi-liquids, for example, in the ore-dressing art which is concerned with the measurement of the specific gravity of ore pulps, to utilize paired bubble tubes in connection with a differential pressure gauge as a specific gravity meter. Air is conducted to the respective bubble tubes by means of suitable piping, and is allowed to bubble out the lower, submerged ends of the tubes at a constant rate. The tubes are of different lengths, so that there is a pressure differential established between the two in the attaining of uniform air bubble output from the respective tubes. This pressure differential is indicated by a differential pressure gauge, for example, a manometer, connected to the air-supply lines by suitable piping.

In the operation of these so-called bubble tube meters, especially where the material operated upon is a liquid containing solid particles in suspension, as is an ore pulp, silt and other sediments tend to collect within the bubble tubes and at the air-discharging orifices thereof, interfering with proper operation and rendering the measurements inaccurate.

It is a primary object of the present invention to provide a system for periodically flushing the bubble tubes, without removing them from their operative positions within the body of the liquid being operated upon.

Other principal objects of the invention are:

To provide for controlling the periodic flushing automatically;

To flush from the inside of the bubble tubes, thus completely removing the deposited silt and other sediments;

To provide for a readily variable flush period;

To guard the differential pressure gauge from surge effects of the flushing action;

To enable the periodic flushing of a plurality of bubble tube arrangements in timed sequence;

To provide a positive acting yet simple, arrangement for flush control;

To provide a highly effective electronic timing arrangement which is relatively inexpensive to build and install and to keep in good running order.

In accordance with one preferred embodiment of the invention, a flush valve is interposed in a flushing-fluid line which leads into the respective bubble tubes, and shut-off valves are interposed in the pressure communicating conduits which connect such bubble tubes with the differential pressure gauge. Timing mechanism is arranged to open the flush valve periodically, and a second timing mechanism is arranged to close the shut-off valves coincidentally with the opening of the flush valves. The second timing mechanism is so coupled with the first or flush timing mechanism as to commence its timing cycle at the termination of the flush cycle controlled by the said first timing mechanism.

Where a plurality of bubble tube arrangements is employed pursuant to the invention, selector mechanism is provided to establish the desired sequence of operations. Each set of bubble tubes is flushed either immediately after the taking of a measurement therefrom, or at some suitable and convenient later time in the measurement cycle covering the several bubble tube arrangements. Accordingly, the surge effect from the flushing of any particular set of bubble tubes has an opportunity to subside following the taking of a measurement and during operation with respect to the other sets of bubble tubes, it being understood that all the sets utilize a single differential pressure gauge in common and that the individual sets are connected and disconnected with respect thereto in accordance with a predetermined cyclic sequence.

In some instances, which are now relatively unimportant, a single bubble tube is utilized in connection with a specific gravity meter of the general type described, the pressure differential being established between it and atmosphere. Obviously, the flush system of the invention is equally as well adapted to such single bubble tube arrangements as to the double bubble tube arrangements here discussed in detail.

Further objects and features of the invention will be apparent from the following detailed description of the presently preferred specific constructions illustrated in the accompanying drawings.

Figure 2:
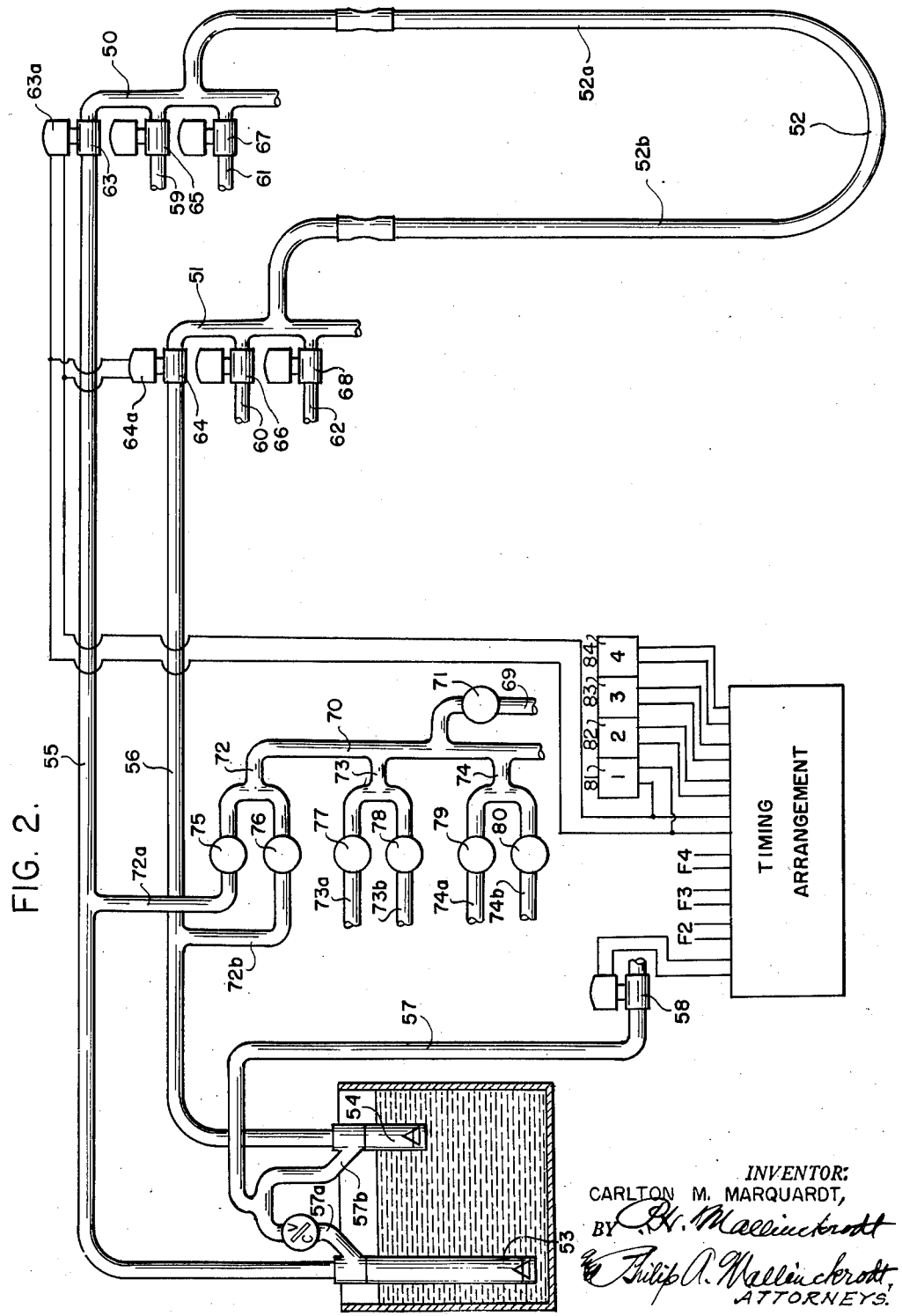

In the drawings:

Fig. 1 represents a schematic view of the system as adapted for a single installation of double or paired bubble tubes, a wiring diagram of a preferred electronic timing arrangement being included;

Fig. 2, a schematic view of the system as adapted for a plurality of installations of paired bubble tubes; and, Fig. 3, a wiring diagram of preferred electrical circuits employed in connection with the system of Fig. 2.

Referring now to the drawings: The system illustrated in Fig. 1 involves a single arrangement of double or paired bubble tubes, indicated 10 and 11, respectively, disposed at mutually different depths in a body of liquid or semi-liquid 12 whose specific gravity is to be measured.

The bubble tubes 10 and 11 may be of conventional construction, but are preferably of the improved novel types disclosed in my copending application Ser. No. 44,145 filed August 13, 1948, and entitled "Bubble Tube for Specific Gravity Meters."

The respective bubble tubes 10 and 11 of the bubble tube arrangement are each provided with a steady flow of air or other suitable gas from a source of supply of same, such as an air compressor (not shown). As illustrated, the air from the source of supply passes through a constant pressure valve 13, which is interposed in a main supply line 14 and through respective constant volume metering valves 15 and 16, which are interposed in respective branch supply lines 17 and 18. The branch line 17 intersects a flow conduit 19 which connects the bubble tube 10 with one member of a differential pressure gauge, here shown as the leg 20a of a manometer 20; and the branch line 18 intersects a flow conduit 21 which connects the bubble tube 11 with the other member of the differential pressure gauge, here the leg 20b of the manometer 20.

During operation of the specific gravity meter constructed as above described, values are registered by the manometer 20 in accordance with differential pressures established in the respective pressure-transmission or flow conduits 19 and 21, the difference in pressures arising by reason of the greater air pressure required for the more deeply submerged bubble tube 10 over that required for the less deeply submerged bubble tube 11 in maintaining substantially equivalent bubble discharge from the two tubes. Such values registered by the manometer 20 are representative of the specific gravity or density of the body of liquid or semi-liquid 12.

For this essentially conventional specific gravity or liquid density meter arrangement, I provide a system for flushing the bubble tubes in order to constantly maintain them free of sediment.

While I realize that the flushing of bubble tubes is not a new conception, I provide by the present invention a trouble-free system which automatically maintains the bubble tubes at peak operating efficiency regardless of the presence in the liquid body of quantities of silt, sludge, and other sediments, or of the formation of scum, that would otherwise impair the accuracy of the meter. Furthermore, this is accomplished without adverse effect on the differential pressure gauge and without disturbing the measuring capacity thereof.

Flushing water or other suitable fluid is conducted to the bubble tube arrangement by means of a conduit 22, which has a branch 22a communicating with the inside of bubble tube 10 and a branch 22b communicating with the inside of bubble tube 11. A check valve 23 permits the flushing fluid to pass into the longer bubble tube during a flushing operation, while preventing air therefrom from escaping into the shorter bubble tube 11 during a measurement operation. A solenoid-operated flush valve 24 is interposed in the supply line 22 for controlling flow of flushing fluid therethrough.

It should be noted that the above arrangement provides for flushing the bubble tubes from the inside, which has been found to be a highly satisfactory way of dislodging sediment from the bubble-emitting openings of the tubes, especially where such openings are of the nature employed in the bubble tubes of my afore-referred-to copending application Serial Number 44,145.

In order to protect the differential pressure gauge from surge effects and turbulence of the flushing operation, shut-off valves are interposed in the air-supply conduits. As illustrated, solenoid-operated valves 25 and 26 are interposed in the flow conduits 19 and 21, respectively, thereby affording complete cut-off of the manometer 20 from the bubble tubes 10 and 11 during any flushing operation.

Sequential flushing cycles are initiated at regular time intervals, and are controlled in duration, by suitable timing means. Other means are arranged to open and close the shut-off valves which control communication of the bubble tubes with the differential pressure gauge, in predetermined timed relationship relative to the flushing cycles to effect the above-mentioned protection for the differential pressure gauge.

A feature of the presently described single bubble tube installation of the invention resides in the fact that the aforementioned timing means is utilized to cause the activation of a second timing means, which is operative to close the shut-off valves at the commencement of the flushing operation, but whose timing period does not commence until the termination of the flushing operation. Accordingly, the shut-off valves remain closed for a predetermined time period following each flushing operation, thereby enabling turbulence of the body of liquid or semi-liquid 12 to subside prior to the subsequent measuring operation.

As illustrated, ratchet wheel 27, driven by a constant speed clock motor or other suitable means (not shown), acts upon an electric timer switch 28 in well known manner to open and close, at regular intervals, an electronic timer circuit controlled by said switch. Thus, this mechanism may be regarded as one preferred form of interval timer.

The particular electronic timer illustrated within the dotted box 29 is of known construction. The novelty in the present arrangement resides in the manner in which it is tied in with the second electronic timer described hereinafter. It should be noted that the first timer acts as a timing control for the flush valve operating and control means, while the second timer acts as a timing control for the shut-off valve operating and control means.

Considering now briefly the structure and operation of the first timer 29: transformer secondary 30 is connected in phase with transformer secondary 31, which is connected in the anode circuit of triode electronic tube 32 in series arrangement with the coil 34a of double pole, single-throw relay 34. Accordingly, when the interval timer switch 28 is closed, transformer secondary 30 is shorted out so that no voltage is applied to the grid of triode 32. The anode of said triode then passes current, and relay coil 34a is energized, whereby the respective sets of contacts 34b and 34c are maintained open.

When interval timer switch 28 is opened by movement of the ratchet wheel 27, transformer secondary 30 applies a potential across the grid of triode 32. Since this potential is in phase with transformer secondary 31, the grid is made positive each time the anode is made positive, it being understood that alternating current is applied across the power supply leads designated 33. Thus triode 32 continues to conduct anode current, relay coil 34a remains energized, and the sets of relay contacts 34b and 34c remain open even though interval timer switch 28 has been thrown open.

Connected in the grid circuit of the triode 32, in the manner illustrated, is a capacitor 35 and respective resistors 36 and 37. The resistor 36 is fixed, and the resistor 37 is variable. These constitute an adjustable timing assembly.

When the switch 28 is open, as aforementioned, the capacitor 35 is charged by means of grid rectification, to a voltage substantially equal to the peak voltage across transformer secondary 30. The charge on the capacitor is such that the grid end thereof is negative relative to the cathode of the triode 32. Accordingly, when switch 28 is closed and transformer secondary 30 shorted out, there is placed, in effect, a high negative voltage or bias on the grid of triode 32, causing the cessation of anode current flow. Thus, relay 34 is de-energized, causing contacts 34b and 34c to close. This high negative charge can be removed from the grid only by dissipation through the resistors 36 and 37, which takes an amount of time dependent upon the total amount of resistance in the circuit. The fixed resistance 36 establishes a set minimum time period, which may be increased as desired by an appropriate setting of variable resistance 37.

The set of relay contacts 34b controls solenoid 24a of flush valve 24, the arrangement being such that when relay coil 34a is de-energized, such contacts are closed, thereby opening the flush valve 24 and permitting flushing fluid to flow into the respective bubble tubes. When relay coil 34a is energized, said contacts are open, solenoid 24a de-energized, and flush valve 24 closed, thereby stopping the flow of flushing fluid. Thus, the flush valve operating means in this instance is solenoid 24a and the control means therefore comprises one of the two switches component to relay 34.

In the operation of the system, immediately after the closing of timer switch 28 and within the time interval between the closing and the next opening thereof, the flushing operation ensues for a time period determined in length by the set minimum resistance 36 plus any desired increment of resistance added by variable resistance 37.

The second timer, activated under the control of the first timer 29, is shown enclosed in the dotted box 40. Its activation is controlled by the set of relay contacts or relay switch 34c. Thus, it might be said that the relay 34 is common to both the first and second timers.

The second timer 40 is essentially similar to the first. It comprises a triode electronic tube 41, whose anode circuit is so connected to the transformer secondary 31 that the voltage supplied therefrom is in phase with that supplied the anode circuit of triode 32. The coil 43a of a single pole single throw relay 43 is connected in series with the anode of triode 41.

As illustrated, the grid circuit of triode 41 comprises a capacitor 44, a fixed minimum resistance 45, and a variable resistance 46, which together constitute an adjustable timing assembly for this second timer.

When the relay contacts 34c are open, which is the case when the flush valve 24 is closed during a measurement operation, no voltage is applied to the grid of triode 41 by the transformer secondary 47. Accordingly, there is no anode current flowing, and relay contacts 43b are closed. The second timer is activated.

Relay 43 controls the solenoid of shut-off valves 25 and 26, and the arrangement is such that, when contacts 43b are closed by reason of relay coil 43a being energized, the solenoids 25a and 26a of the respective shut-off valves are energized, thereby opening such shut-off valves and establishing communication between the respective flow conduits 19 and 21 and the respective manometer legs 20a and 20b. This is the open condition required for the above-mentioned measurement operation.

During a measurement operation when interval timer switch 28 and the set of relay contacts 34c are open, transformer 30 being shorted out, timer 29 is inactive. When switch 28 closes, timer 29 is activated and, since voltage from capacitor 35 immediately commences to dissipate within resistances 36 and 37, the active timing cycle commences immediately.

As aforestated, during the period of inactivity of timer 29, no voltage from transformer secondary 47 is applied to the grid of triode 41.

When timer 29 is active, relay contacts 34c are closed, thus applying voltage from transformer secondary 47 to the grid of triode 41. As illustrated, transformer secondary 47 is connected in such a manner that its voltage is in phase opposition to the anode voltage supplied by transformer secondary 31 to the anode of triode 41. Since this transformer 47 voltage is in phase opposition to the anode voltage supplied by transformer secondary 31, the anode of triode 41 ceases to pass current and relay coil 43a is de-energized, thereby opening relay contacts 43b and de-energizing the operating solenoids 25a and 26a of the respective shut-off valves, whereby such valves close.

At the same time, capacitor 44 is charged to substantially the peak voltage of transformer secondary 47, by grid rectification, with the grid end thereof negative relative to the cathode of triode 41. So long as contacts 34c remain closed, that is, so long as timer 29 is active, capacitor 44 will remain fully charged even though second timer 40 has been activated by the closing of relay contacts 34c. However, when timer 29 completes its active timing cycle, as described above, contacts 34c open, and timer 40 commences its active timing cycle.

The commencement by the second timer 40 of its timing cycle, following the preliminary de-energization of relay coil 43a during the active timing cycle of the first timer 29, is brought about by the fact that the negative charge on capacitor 44 holds the grid of triode 41 negative with respect to its cathode. This charge can only be dissipated through resistances 45 and 46.

When the charge on capacitor 44 has been dissipated in a manner similar to that explained above in connection with timer 29, the triode 41 again passes anode current, energizing relay coil 43a and closing contacts 43b, whereby the solenoid shut-off valves 25 and 26 are opened, again establishing communication between the flow conduits 19 and 21 and the manometer legs 20a and 20b, respectively.

Thus, it is seen that the second timer 40 cannot commence its timing cycle, as distinguished from its operative cycle, until the first timer 29 has completed its timing cycle.

It should be noted that changing the flush period or active timing period of the first timer 29 by adjusting variable resistor 37, does not in any way affect the duration of the active timing cycle of timer 40; also, that the set of relay controls, which in effect form one of the two switches component to relay 34, provides activating means for the timing control represented by the second timer 40.

A manually operable switch 48 is provided, as illustrated, for function as a lock-out switch to prevent the flushing cycle from taking place when repairs or adjustments are being made.

A second manually operable switch 49, preferably of push-button, normally closed type, as illustrated, permits the system to be put through the flushing cycle at will, regardless of the automatic operable switch 28. The switch 49 is preferably of the type indicated so that an operator cannot hold the switch down and produce an excessively long flush cycle. With this type of switch, the flush cycle takes place only after pressure on the push-button is released.

It has been found desirable in many instances to utilize a single differential pressure gauge with several sets or arrangements of bubble tubes, the measurement from the several sets being taken independently and sequentially. With such a system, flushing of the respective sets of bubble tubes follows the respective measurement operations in some desired sequential arrangement.

In the embodiment illustrated in Fig. 2, several sets of paired bubble tubes have their respective component tubes connected by respective pressure-transmission or flow conduits to manifolds 50 and 51, such manifolds leading to the respective legs 52a and 52b of a manometer 52.

For the sake of convenience only one set of bubble tubes is actually shown, the bubble tubes thereof being indicated 53 and 54. These bubble tubes communicate with the manifolds 50 and 51, respectively, by means of respective flow conduits 55 and 56, and are supplied with flush fluid through a flow line 57, and the respective branches thereof, 57a and 57b, under the control of a solenoid-operated flush valve 58.

The other sets of bubble tubes (not illustrated) connect with respective sets of flow conduits similar to 55 and 56. Two such sets of flow conduits are indicated at 59 and 60, and at 61 and 62, respectively, these sets serving respective sets of bubble tubes corresponding to that which is illustrated. Any number of sets may be incorporated in the system in the same manner, though the system shown, see particularly the wiring diagram of Fig. 3, has four sets. Such other sets of bubble tubes are provided with respective flushing-fluid flow lines (not illustrated) corresponding to that indicated 57, each controlled by a solenoid-operated flush valve corresponding to that indicated at 58.

As in the case of the previously described flushing system for a single pair of bubble tubes, the flow conduits connecting the respective bubble tubes of each set with the respective legs of the manometer are provided with solenoid-operated shut-off valves. In the present multiple embodiment, the flow conduits 55 and 56 are provided with solenoid-operated shut-off valves 63 and 64, respectively; the flow conduits 59 and 60 with shut-off valves 65 and 66, respectively; and the flow conduits 61 and 62 with shut-off valves 67 and 68 respectively.

Likewise, as in the case of the previously described embodiment, the present multiple system has the respective flow conduits thereof supplied with air through a common supply line. As illustrated, a main air or other suitable gas supply line 69 feeds air or other suitable gas under pressure to manifold 70 through constant pressure valve 71. The flow conduits 55 and 56 are supplied with air by way of intermediate supply line 73 and respective branches thereof 73a and 73b; and the flow conduits 61 and 62 are supplied with air by way of intermediate supply line 74 and respective branches thereof, 74a and 74b. Constant volume metering valves 75 and 76 control the flow of air through the respective branch lines 72a and 72b; similar valves 77 and 78 control the flow of air through the respective branch lines 73a and 73b; and similar valves 79 and 80 control the flow of air through the respective branch lines 74a and 74b. Respective signal lights 81, 82, 83 and 84 indicate which set of bubble tubes is currently operating in connection with the manometer 52.

The timing arrangement utilized for controlling the sequential flushing of the plurality of bubble tube sets is not detailed in Fig. 2, but is rather indicated by an appropriately labeled box. Such timing arrangement is, however, illustrated in detail schematically in Fig. 3.

In Fig. 3 timing means corresponding to those illustrated in Fig. 1, are shown enclosed by dash lines 85. For the present multiple embodiment, the first timer—shown enclosed within dash lines 86—is the essential part of the electronic timing means 85. The second timer, shown enclosed within dash lines 87, is provided merely to make it possible to operate any single set of bubble tubes in a manner similar to the first described embodiment should it be so desired at any time. In such event the multiple system becomes, in effect, a single system similar to the embodiment first described. Accordingly, interposed between the two timers 86 and 87 is a selector switch 88, which may be set to any one of several numbered positions corresponding to the respective sets of bubble tubes involved in the multiple arrangement, but which will normally be set to "automatic," at which position the second timer 87 is rendered inoperative.

In the illustrated instance, the arm 88a of selector switch 88 is set at "automatic," so that the system is arranged for multiple operation.

The operative cycles of the respective sets of bubble tubes are controlled by a suitable sequential actuator, such as the "Electronik" strip chart recorder manufactured by the Brown Instrument Co., and descriptively referred to in its Catalogue No. 15-10 issued in the year 1946. As illustrated, within the recorder instrument is a rotary selector switch 90, which comprises two rotary sector switches 90a and 90b mechanically linked together for synchronous operation. Each of the said sector switches 90a and 90b is equipped with a number of sectors corresponding to the number of individual sets of bubble tubes involved in the system, the number here being four.

The several sectors of the rotary switch 90a are electrically connected to one pole, indicated A, of respective triple pole, single throw, selector relays 91, 92, 93 and 94, while the several sectors of rotary switch 90b are electrically connected to the coils 91a, 92a, 93a and 94a of the respective selector relays.

Accordingly, when the sweep contact arms of the respective rotary sector switches 90a and 90b are in contact with a particular sector, the corresponding relay is energized and the pole A of such relay completes the circuit through electronic timer 86.

The poles B of the respective relays control respective sets of shut-off valves, while the poles C of the respective relays control respective flush valves.

In operation, when the sweep contacts of sector switches 90a and 90b "make" with respective sector contacts No. 1, relay 91 is energized, thereby closing the contacts of all three poles A, B and C, thereof. The arrangement is such that when the contacts of relay pole B are closed, solenoids 63a and 64a of shut-off valves 63 and 64 are energized to hold open the respective shut-off valves, thereby establishing pressure communication between bubble tubes 53 and 54 and manometer legs 52a and 52b, respectively, through flow conduits 55 and 56.

Since the operation of this multiple system of the invention is sequential with respect to the several sets of bubble tubes, the arrangement is such that a previously operated set of bubble tubes is flushed at the same time that the currently operated set is carrying out a measurement operation. In the illustrated instance the arrangement is such that the sequence is a direct one, that is to say, that the set of bubble tubes whose measurement operation immediately preceded the particular set in operation at any given period is flushed during the operation of that particular set.

Thus, the flush valve associated with No. 4 set of bubble tubes (not illustrated, but indicated by F4) has its solenoid electrically connected in circuit with the contacts of relay pole 91C. Accordingly, during the open period of shut-off valves 63 and 64, flush valve F4 will open, through action of timer 86. This means that during a measurement operation by No. 1 set of bubble tubes, No. 4 set of bubble tubes will be flushed, and that, during such flushing of said No. 4 set, the shut-off valves thereof (indicated S4 in Fig. 3) will be closed, thereby protecting the manometer 52 from the flush turbulence.

When recorder switch 90 moves its respective sweep contacts to "make" position with No. 2 sector contacts thereof, the above described operation is repeated with respect to No. 2 set of bubble tubes, that is to say, shut-off valves 65 and 66 of said No. 2 set are held open, affording a measurement operation with respect to that set of bubble tubes, while flush valve 58 of No. 1 set is opened by action of timer 86 for the flushing of that set of bubble tubes.

Thus, the operative cycle is carried on in sequence through the several sets of bubble tubes under the general time control of recorder switch 90, timer 86 determining the time lengths of each flushing period. It should be noted that, during this automatic operation, the second timer 87 is cut out of the system by means of selector switch 88. Its function is taken care of by the recorder switch 90, whose rotary sector switches insure the opening of only those shut-off valves corresponding to the particular set of bubble tubes undergoing a measurement operation at any given time.

Mechanically ganged with the selector switch 88 are selector switches 95, 96, 97, 98 and 99, which cut out of the circuit all but the particular set of bubble tubes, either No. 1, 2, 3 or 4, desired for single operation in the manner of the previously described embodiment, in the event that multiple operation is not desired. The turning of sweep contact arm 88a from "automatic" to the particular bubble set desired, places the system in condition for such single operation.

It should be noted that in such single operation with respect to any one of the several sets of bubble tubes, the flushing cycle is carried out periodically with respect to only that one set of bubble tubes which is operating, the action corresponding in every particular to that of the embodiment first described.

While it is preferred to use ordinary vacuum electronic triode tubes in the timer circuits, as illustrated, thyratron tubes may be employed if desired, in a manner well known to the art.

It should be noted that, by connecting the flushing-fluid supply piping with the pressure-communicating piping adjacent connection of the latter with the bubble tubes, such bubble tubes are most effectively and forcefully flushed from the inside.

Whereas this invention is here illustrated and described with respect to certain preferred forms thereof, it should be understood that various changes may be made in such forms and various other forms may be constructed on the basis of the teachings herein by those skilled in the art without going beyond the scope of the following claims.

I claim:

1. A flush system for specific gravity measuring devices equipped with bubble tubes, bubble-forming fluid supply piping, and a differential pressure gauge which is operatively connected with said bubble tubes by pressure-communicating piping, said system comprising piping arranged for the supply of flushing fluid to said bubble tubes; valve means interposed in said flush piping; shut-off valve means interposed in said pressure-communicating piping; operating means for said flush valve means; control means for said flush valve operating means; a timing control for said control means; an interval timer for activating said timing control; operating means for said shut-off valve means; control means for said shut-off valve operating means; a timing control for the last-named control means; and activating means for the last-named timing control, said activating means being operatively connected with the control means for said flush valve operating means.

2. The combination recited in claim 1, wherein the operating means for the flush valve and the shut-off valves are respective solenoids; the control means for both the flush and the shut-off valve operating means are respective electrical relays; the timing controls for both the control means are respective electronic timer circuits in which the said electrical relays are respectively connected; the interval timer includes a timing switch arranged to periodically open and close the electronic timer circuit associated with the flush valve; and the activating means for the shut-off valve timing control is an electrical switch constituting part of the flush valve control electrical relay.

3. The combination recited in claim 2, wherein the respective electronic timer circuits each include a triode electronic tube; and a timing assembly connected in the grid circuit of said tube constructed and arranged to control negative grid bias over a predetermined time period, the electrical relays being connected in the anode circuits of the respective tubes, and the power source for the grid circuit of the shut-off valve control tube being arranged to apply voltage in phase opposition to that supplied by the power source for the anode circuit of that tube.

4. The combination recited in claim 3, wherein the power source for the anode circuit of the flush valve control tube is arranged to supply voltage in phase with the voltage supplied by the power source for the grid circuits of both tubes.

5. The combination recited in claim 4, wherein the power source for the anode circuit of the flush valve control tube is one transformer secondary, the power source for the anode circuit of the shut-off valve control tube is a second transformer secondary arranged to supply voltage in phase opposition to the voltage supplied by said one transformer secondary, and the power source for the grid circuits of both tubes is a third transformer secondary arranged to supply voltage in phase with the voltage supplied by said one transformer secondary.

6. The combination recited in claim 5, wherein each timing assembly comprises a capacitor and resistor means.

7. The combination recited in claim 6, wherein the resistor means includes a fixed minimum resistor and a variable resistor.

8. The combination recited in claim 1, wherein a manually operable switch of normally closed, push button type is arranged in series circuit with the interval timer.

9. The combination recited in claim 1, wherein there are a plurality of individual sets of bubble tubes and a single differential pressure gauge, the several sets of bubble tubes being equipped with respective sets of pressure-communicating piping which lead into common manifolds communicating with the said differential pressure gauge, and being equipped, further, with respective piping arrangements for the supply of flushing fluid to the bubble tubes of said sets; wherein respective valve means are interposed in said flushing-fluid piping arrangements; respective sets of shut-off valve means are interposed in said sets of pressure-communicating piping; and individual operating means are provided for the respective flushing-fluid valve means and the respective shut-off valve means; wherein the interval timer is a sequential actuator; and wherein selector relays and ganged selector switches are provided for controlling valve operation relative to the respective sets of bubble tubes, the said ganged selector switches including a selector switch associated with the said sequential actuator, and a selector switch interposed between the respective timing controls, whereby the system may be operated in multiple automatically, or singly with respect to a selected one of the said plurality of sets of bubble tubes.

10. A flush system for specific gravity measuring devices equipped with a plurality of individual sets of bubble tubes; a single differential pressure gauge, respective pressure-communicating piping arrangements connecting the said sets of bubble tubes with the said differential pressure gauge, and respective piping arrangements for the supply of air or other suitable gas to the bubble tubes of said sets; said system comprising respective piping arrangements for the supply of flushing fluid to the bubble tubes of said sets; respective valve means interposed in said flushing-fluid piping arrangements; respective sets of shut-off valve means interposed in said pressure-communicating piping arrangements; individual operating means for the respective flushing-fluid valve means and the respective shut-off valve means; control means for said flush valve operating means; a timing control for said control means; and a sequential actuator with which said flush valve control means, said respective flush valve operating means, and said respective shut-off valve operating means are operatively connected for sequential operation with respect to the several sets of bubble tubes with which they correspond.

11. A specific gravity measuring system, comprising a plurality of sets of bubble tubes; a single differential pressure gauge having intake manifolds; respective pressure-communicating piping arrangements connecting the bubble tubes of said sets with the respective intake manifolds; respective piping arrangements for the supply of air or other suitable gas to the bubble tubes of said sets; respective piping arrangements for the supply of flushing fluid to the bubble tubes of said sets; respective valve means interposed in said flushing-fluid piping arrangements; respective sets of shut-off valve means interposed in said pressure-communicating piping arrangements; individual operating means for the respective flushing-fluid valve means and the respective shut-off valve means; control means for said flush valve operating means; a timing control for said control means; and a sequential actuator with which said flush valve control means, said respective flush valve operating means, and said respective shut-off valve operating means are operatively connected for sequential operation with respect to the several sets of bubble tubes with which they correspond.

12. The combination recited in Claim 1, wherein the flushing-fluid piping intersects and discharges into the pressure-communicating piping adjacent connection of the latter with said bubble tubes.

13. The combination recited in Claim 10, wherein the flushing-fluid piping intersects and discharges into the pressure-communicating piping adjacent connection of the latter with said bubble tubes.

14. The combination recited in Claim 11, wherein the flushing-fluid piping intersects and discharges into the pressure-communicating piping adjacent connection of the latter with said bubble tubes.

15. A flush system for specific gravity measuring devices equipped with bubble tubes, air-supply piping, and a differential pressure gauge which is operatively connected with said bubble tubes by pressure-communicating piping, said system comprising piping arranged for the supply of flushing fluid to said bubble tubes; valve means interposed in said flush piping; shut-off valve means interposed in said pressure-communicating piping; timing means arranged to open and close said flush valve means at predetermined time intervals to establish definite flushing cycles for said bubble tubes; and a second timing means operatively interconnected with the first timing means and arranged to open and close said shut-off valve means in predetermined timed relationship relative to said flushing cycles so as to protect the said differential pressure gauge from flushing turbulence.

16. A flush system for a specific gravity measuring device equipped with at least one bubble tube, air-supply piping, and a differential pressure gauge which is operatively connected with said bubble tube by pressure-communicating piping, said system comprising piping arranged for the supply of flushing fluid to said bubble tube; valve means interposed in said flush piping; timing means arranged to open and close said flush valve means at predetermined time intervals to establish definite flushing cycles for said bubble tube; valve means interposed in said pressure-communicating piping for cutting off flow communication between said bubble tube and said pressure gauge; and timing means arranged to open and close the last-named valve means at predetermined time intervals, the last-named timing means being operatively correlated with the first-named.

17. A flush system for specific gravity measuring devices equipped with at least one bubble tube, bubble-forming fluid supply piping, and a differential pressure gauge which is operatively connected with said bubble tube by pressure-communicating piping, said system comprising piping arranged for the supply of flushing fluid to said bubble tube; valve means interposed in said flush piping; shut-off valve means interposed in said pressure-communicating piping; operating means for said flush valve means; timing control means for said flush valve operating means; operating means for said shut-off valve means; and timing control means for said shut-off valve operating means, said last named timing control means being operatively correlated with the said first named timing control means for said flush valve operating means.

CARLTON M. MARQUARDT.

REFERENCES CITED

The following references are of record in the file of this patent:

UNITED STATES PATENTS

| Number | Name | Date |
| --- | --- | --- |
| 1,819,655 | Mohr | Aug. 18, 1931 |
| 1,931,274 | Thomas | Oct. 17, 1933 |
| 2,427,690 | Peterson | Sept. 23, 1947 |
| 2,509,834 | More | May 30, 1950 |